United States Patent
Tseng et al.

(10) Patent No.: US 8,429,501 B2
(45) Date of Patent: Apr. 23, 2013

(54) MEMORY STORAGE DEVICE, MEMORY CONTROLLER THEREOF, AND METHOD THEREOF FOR GENERATING LOG LIKELIHOOD RATIO

(75) Inventors: Chien-Fu Tseng, Yunlin County (TW); Kuo-Hsin Lai, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 387 days.

(21) Appl. No.: 12/947,799

(22) Filed: Nov. 16, 2010

(65) Prior Publication Data

US 2012/0072805 A1    Mar. 22, 2012

(30) Foreign Application Priority Data

Sep. 17, 2010 (TW) ................ 99131626 A (51) Int. Cl.
G06F 11/00 (2006.01)
(52) U.S. Cl.
USPC .......................................... 714/773; 714/723
(58) Field of Classification Search .......... 714/773, 714/774, 758, 757, 754, 766, 723, 20
See application file for complete search history.

(56) References Cited

U.S. PATENT DOCUMENTS

| 7,395,466 | B2 | 7/2008 | Dempsey |
| 7,983,082 | B2 | 7/2011 | Park et al. |
| 2009/0006924 | A1* | 1/2009 | Ho ............................... 714/758 |
| 2009/0168573 | A1 | 7/2009 | Zhang et al. |
| 2012/0311402 | A1* | 12/2012 | Tseng et al. ................. 714/763 |

OTHER PUBLICATIONS

"Office Action of U.S. counterpart application" issued on Feb. 7, 2013, p1-p7.

* cited by examiner

Primary Examiner — Dieu-Minh Le
(74) Attorney, Agent, or Firm — Jianq Chyun IP Office (57) ABSTRACT

A memory storage device, a memory controller, and a log likelihood ratio (LLR) generation method are provided. A read data corresponding to a first storage state is obtained from memory cells of a flash memory chip in the memory storage device by using bit data read voltages. An error checking and correcting procedure is performed on the read data to obtain a second storage state corresponding to the read data when the read data is written. An amount of storage error is obtained in storage states satisfying a statistic number, and a storage error means that data is in the second storage state when being written and is in the first storage state when being read. A logarithmic operation is executed according to the statistic number, an amount of the storage states, and the amount of storage error to generate a first LLR of the read data.

24 Claims, 6 Drawing Sheets

| | | | | Storage error occurs on LSB | Storage error occurs on CSB | Storage error occurs on MSB |
|---|---|---|---|---|---|---|
| First storage state | 0 | 0 | 0 | * | 010 → 000 | 001 → 000 |
| | 0 | 0 | 1 | 101 → 001 | * | 000 → 001 |
| | 0 | 1 | 0 | * | 000 → 010 | 011 → 010 |
| | 0 | 1 | 1 | * | * | 010 → 011 |
| | 1 | 0 | 0 | * | 110 → 100 | 101 → 100 |
| | 1 | 0 | 1 | 001 → 101 | * | 100 → 101 |
| | 1 | 1 | 0 | * | 100 → 110 | 111 → 110 |
| | 1 | 1 | 1 | * | * | 110 → 111 |

MEMORY STORAGE DEVICE, MEMORY CONTROLLER THEREOF, AND METHOD THEREOF FOR GENERATING LOG LIKELIHOOD RATIO

CROSS-REFERENCE TO RELATED APPLICATION

This application claims the priority benefit of Taiwan application serial no. 99131626, filed on Sep. 17, 2010. The entirety of the above-mentioned patent application is hereby incorporated by reference herein and made a part of this specification.

BACKGROUND OF THE INVENTION

1. Field of the Invention

The present invention generally relates to a log likelihood ratio (LLR) generation method for an error checking and correcting (ECC) procedure, and more particularly, to a memory storage device and a memory controller using the LLR generation method.

2. Description of Related Art

Along with the widespread of digital cameras, cell phones, and MP3 in recently years, the consumers' demand to digital storage media has increased drastically. Flash memory is one of the most adaptable storage media to be carried around and used for storing digital files due to its many characteristics such as data non-volatility, low power consumption, small volume, and non-mechanical structure. A solid state drive (SSD) is a storage device which uses a flash memory as its storage medium, and SSD has been broadly applied in computer systems as the master hard discs.

Existing flash memories can be categorized into NOR flash memories and NAND flash memories. The flash memories can also be categorized into multi-level cell (MLC) flash memories and single-level cell (SLC) flash memories according to the number of data bits stored in each memory cell. Each memory cell of a SLC flash memory stores data of only one bit, while each memory cell of a MLC flash memory stores data of two or more bits. Taking a 4-level cell flash memory as an example, each memory cell thereof stores data of 2 bits (i.e., "11", "10", "00", and "01").

The memory cells in a flash memory are connected by bit lines and word lines into a memory cell array. When the control circuit for controlling the bit lines and the word lines reads data from or writes data into a specific memory cell of the memory cell array, the floating voltages in other memory cells may be disturbed and accordingly error bits may be produced. Namely, the data read by the control circuit from the memory cell (also referred to as read data) is different from the originally written data (also referred to as write data). Or, when the flash memory is worn out due to long idle time, memory leakage, or repeated erasing or writing operations, the floating voltages in the memory cells may also be altered to produce error bits.

An error checking and correcting (ECC) circuit is usually disposed in a memory storage device for performing an ECC encoding on the write data and an ECC decoding on the read data (also referred to as ECC procedures) to correct any error bit. Due to the process advancement or the hardware structure of the flash memory (for example, the more data bits are stored in each memory cell of a flash memory, the more error bits may be produced), such a memory storage device needs to perform the ECC procedure on data by using an ECC technique with a good ECC performance (for example, with a low density parity check (LDPC) code). A lookup table is stored in a memory storage device for recording a mapping relation between soft information and a probability (referred to as a log likelihood ratio (LLR)) of the soft information being corresponded to 0 or 1. Thus, when a LDPC code is used for performing the ECC procedure, the memory storage device first obtains the soft information from a memory cell and then obtains the LLR of the soft information from the lookup table. Then, the memory storage device performs the ECC operation by using the LDPC code. The value of the LLR recorded in the lookup table can be obtained by writing and reading training samples. An accurate LLR can reduce the iteration times in the ECC procedure performed by using the LDPC code, and accordingly, the time for performing ECC decoding on read data can be shortened. However, the error characteristic of a flash memory in a memory storage device changes along with the increase in the erase-program times of the flash memory. Thus, to achieve an optimal LLR, the error characteristic of the flash memory has to be continuously determined, which brings a heavy load to the system.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

Accordingly, the present invention is directed to a method for generating a log likelihood ratio (LLR), wherein the operation load of a memory storage device for estimating the LLR corresponding to read data is reduced.

The present invention is directed to a memory controller, wherein the operation load of a memory storage device for estimating the LLR corresponding to a read data is reduced.

The present invention is directed to a memory storage device with reduced operation load for estimating the LLR corresponding to read data.

The present invention provides a LLR generation method adaptable to a memory storage device. The memory storage device includes a flash memory chip having a plurality of memory cells, wherein each of the memory cells has a plurality of storage states, and the storage states are distinguished by at least one bit data read voltage. The LLR generation method includes obtaining a read data from the memory cells by using the at least one bit data read voltage, wherein the read data is corresponding to a first storage state, and the first storage state is one of the storage states. The LLR generation method also includes performing an error checking and correcting (ECC) procedure on the read data to obtain a second storage state corresponding to the read data when the read data is written, wherein the second storage state is one of the storage states. The LLR generation method further includes obtaining an amount of storage error in the storage states satisfying a statistic number, wherein the storage error means that a corresponding data is in the second storage state when the data is written but is in the first storage state when the data is read. The LLR generation method still includes executing a logarithmic operation according to the statistic number, an amount of the storage states, and the amount of storage error to generate a first LLR of the read data.

The present invention provides a memory controller including a host system interface, a memory interface, a memory management circuit, an ECC circuit, and a LLR estimation circuit. The host system interface is used for coupling to a host system, and the memory interface is used for coupling to a flash memory chip. The flash memory chip includes a plurality of memory cells, and each of the memory cells has a plurality of storage states, wherein the storage states are distinguished by at least one bit data read voltage. The memory management circuit is coupled to the host system interface and the memory interface. The memory management circuit receives a read instruction from the host system and obtains a read data corresponding to the read instruction from the memory cells through the memory interface, wherein the read data is corresponding to a first storage state, and the first storage state is one of the storage states. The memory management circuit includes a LLR lookup table. The ECC circuit is coupled to the memory management circuit. The ECC circuit performs an ECC procedure on the read data to obtain a second storage state corresponding to the read data when the read data is written, wherein the second storage state is one of the storage states. The LLR estimation circuit is coupled to the memory management circuit and the ECC circuit. The LLR estimation circuit obtains an amount of storage error in the storage states satisfying a statistic number, wherein the storage error means that a corresponding data is in the second storage state when the data is written and is in the first storage state when the data is read. Besides, the LLR estimation circuit executes a logarithmic operation according to the statistic number, an amount of the storage states, and the amount of storage error to generate a first LLR of the read data.

The present invention provides a memory storage device including a connector, a flash memory chip, and a memory controller. The connector is used for coupling to a host system. The flash memory chip includes a plurality of memory cells, and each of the memory cells has a plurality of storage states, wherein the storage states are distinguished by at least one bit data read voltage. The memory controller is coupled to the flash memory chip and the connector. The memory controller includes a LLR lookup table. The memory controller controls the flash memory chip to obtain a read data from the memory cells by using the at least one bit data read voltage, wherein the read data is corresponding to a first storage state, and the first storage state is one of the storage states. The memory controller performs an ECC procedure on the read data to obtain a second storage state corresponding to the read data when the read data is written, wherein the second storage state is one of the storage states. The memory controller obtains an amount of storage error in the storage states satisfying a statistic number, wherein the storage error means that a corresponding data is in the second storage state when the data is written and is in the first storage state when the data is read, and the memory controller executes a logarithmic operation according to the statistic number, an amount of the storage states, and the amount of storage error to generate a first LLR of the read data.

As described above, in the present invention, when the memory storage device receives a instruction from the host system and is about to read data, the LLR corresponding to the read data is estimated and updated by using the data with storage errors, so that the operation load on estimating the LLR can be reduced. Besides, because the generated LLR can reduce the iterative times of the ECC procedure, the execution efficiency of the ECC procedure is increased.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

Reference will now be made in detail to the present preferred embodiments of the invention, examples of which are illustrated in the accompanying drawings.

Wherever possible, the same reference numbers are used in the drawings and the description to refer to the same or like parts.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A,B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1A:
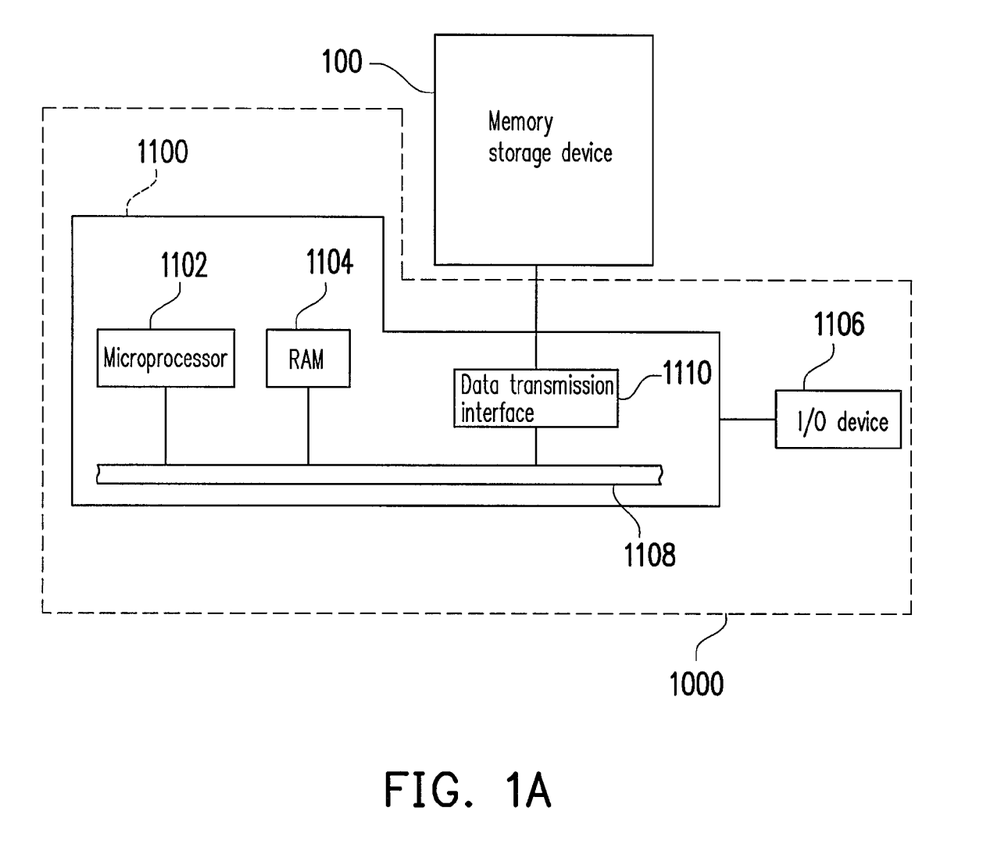
FIG. 1A is a diagram illustrating a host system using a memory storage device according to an exemplary embodiment of the present invention.

FIG. 1A is a diagram illustrating a host system using a memory storage device according to an exemplary embodiment of the present invention.

Figure 1B:
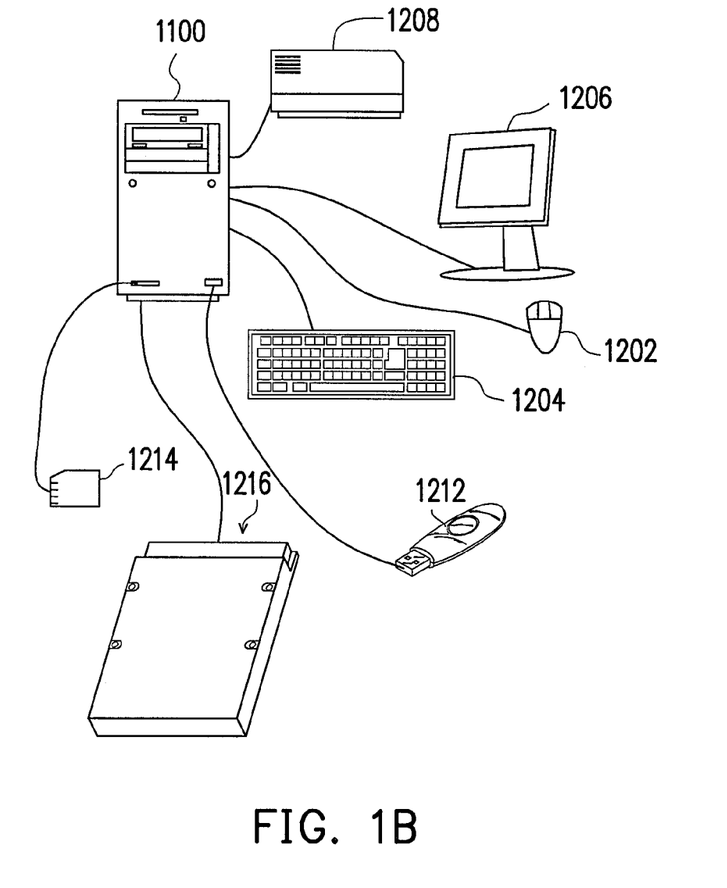
FIG. 1B is a diagram illustrating a computer, an input/output (I/O) device, and a memory storage device according to an exemplary embodiment of the present invention.

The host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the devices illustrated in FIG. 1B are not intended to limit the I/O device 1106, and the I/O device 1106 may further include other devices.

In the present exemplary embodiment, the memory storage device 100 is coupled to other components of the host system 1000 through the data transmission interface 1110. Through the operations of the microprocessor 1102, the RAM 1104, and the I/O device 1106, the host system 1000 can write data into or read data from the memory storage device 100. The memory storage device 100 may be a memory card 1214, a flash drive 1212, or a solid state drive (SSD) 1216, as illustrated in FIG. 1B.

Figure 1C:
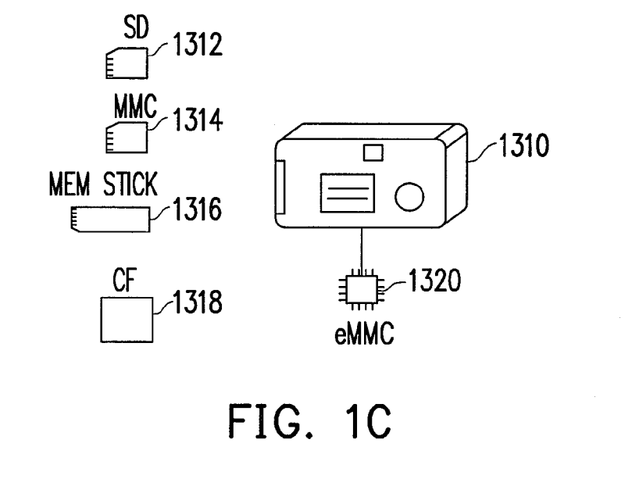
FIG. 1C is a diagram illustrating a host system and a memory storage device according to another exemplary embodiment of the present invention.

Generally speaking, the host system 1000 may be any system that can store data. Even though the host system 1000 is described as a computer system in the present exemplary embodiment, the host system 1000 may also be a cell phone, a digital camera, a video camera, a communication device, an audio player, or a video player in another exemplary embodiment of the present invention. For example, if the host system is a digital camera 1310, the memory storage device is a secure digital (SD) card 1312, a multimedia card (MMC) 1314, a memory stick 1316, a compact flash (CF) card 1318, or an embedded storage device 1320 (as shown in FIG. 1C) used in the digital camera 1310. The embedded storage device 1320 includes embedded MMC (eMMC). It should be mentioned that the eMMC is directly coupled to the substrate of the host system.

Figure 2:
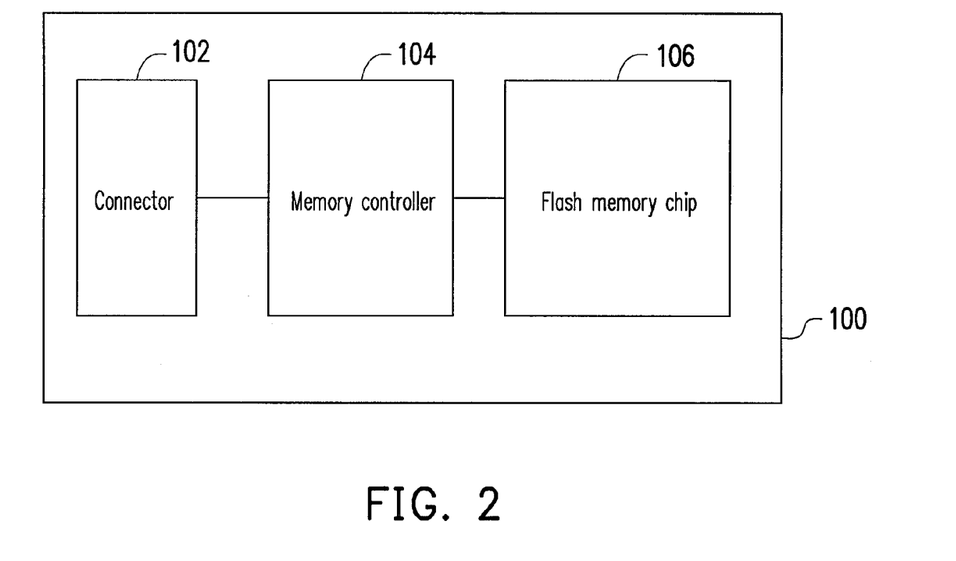
FIG. 2 is a schematic block diagram of the memory storage device in FIG. 1A.

FIG. 2 is a schematic block diagram of the memory storage device 100 in FIG. 1A. Referring to FIG. 2, the memory storage device 100 includes a connector 102, a memory controller 104, and a flash memory chip 106.

The connector 102 is coupled to the memory controller 104 and used for coupling to the host system 1000. In the present exemplary embodiment, the connector 102 is a universal serial bus (USB) interface. However, the present invention is not limited thereto, and in other exemplary embodiments, the connector 102 may also be a multimedia card (MMC) interface, a serial advanced technology attachment (SATA) interface, a parallel advanced technology attachment (PATA) interface, an Institute of Electrical and Electronic Engineers (IEEE) 1394 interface, a peripheral component interconnect (PCI) express interface, a secure digital (SD) interface, a memory stick (MS) interface, a compact flash (CF) interface, an integrated drive electronics (IDE) interface, or any other suitable interface.

The memory controller 104 executes a plurality of logic gates or control instructions implemented in a hardware form or a firmware form and performs various data operations on the flash memory chip 106 according to instructions of the host system 1000. Besides, the memory controller 104 further executes the log likelihood ratio (LLR) generation and dynamic update mechanism provided by the present exemplary embodiment.

The flash memory chip 106 is coupled to the memory controller 104. The flash memory chip 106 stores file system information (for example, a file allocation table (FAT) or a new technology file system (NTFS)) and other general data (for example, text files, video files, and audio files). In the present exemplary embodiment, the flash memory chip 106 is a multi level cell (MLC) NAND flash memory chip. However, the present invention is not limited thereto, and the flash memory chip 106 may also be a single level cell (SLC) NAND flash memory chip, any other flash memory chip, or any other memory chip with the same characteristics.

In the present exemplary embodiment, the flash memory chip 106 includes a plurality of memory cells, and a plurality of floating voltages is used for indicating data of multiple bits. To be specific, the memory cells constitute a memory cell array, wherein the memory cells are connected by a plurality of bit lines and a plurality of word lines. Herein the memory cells are arranged on the cross points of the bit lines and the word lines as an array. Each of the memory cells has a plurality of storage states, and these storage states are distinguished by at least one bit data read voltage and have a storage state order.

Figure 3:
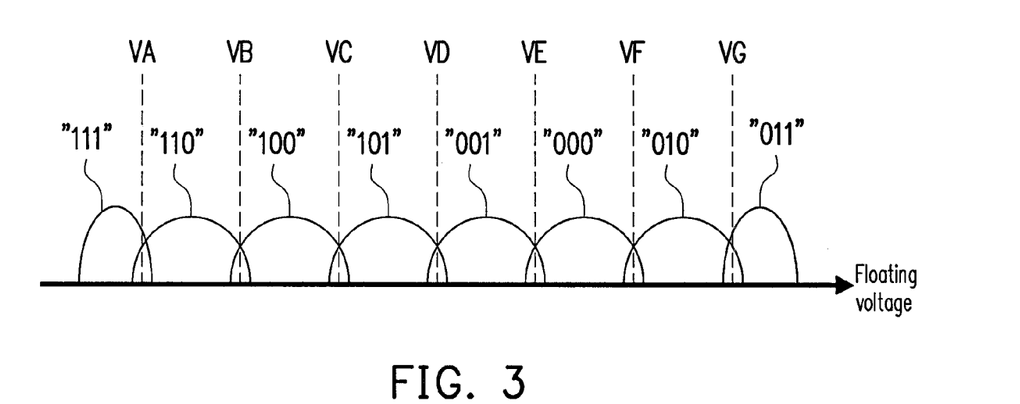
FIG. 3 is a diagram illustrating storage states and bit data read voltages according to an exemplary embodiment of the present invention.

FIG. 3 is a diagram illustrating storage states and bit data read voltages according to an exemplary embodiment of the present invention. In the present exemplary embodiment, the flash memory chip 106 is an 8-level cell NAND flash memory. As shown in FIG. 3, the floating voltages in each memory cell are categorized into 8 storage states (i.e., "111", "110", "100", "101", "001", "000", "010", and "011") according to a first bit data read voltage VA, a second bit data read voltage VB, a third bit data read voltage VC, a fourth bit data read voltage VD, a fifth bit data read voltage VE, a sixth bit data read voltage VF, and a seventh bit data read voltage VG. Each of the storage states includes a least significant bit (LSB), a center significant bit (CSB), and a most significant bit (MSB). For example, in the present exemplary embodiment, starting from the left, the first bit in each storage state is the LSB, the second bit in the storage state is the CSB, and the third bit in the storage state is the MSB. Accordingly, each memory cell can store data of 3 bits, and the memory cells on each word line constitute a storage space of three pages (i.e., a lower page, a middle page, and an upper page). Namely, the LSB in each memory cell is corresponding to the lower page, the CSB in each memory cell is corresponding to the middle page, and the MSB in each memory cell is corresponding to the upper page. In addition, several pages constitute a physical block. Herein physical block is the smallest unit for erasing data. Namely, each physical block contains the least number of memory cells that are erased together. In the present exemplary embodiment, the storage state order of the eight storage states is "111", "110", "100", "101", "001", "010", and "011". It should be noted that the storage state order is not limited herein and may vary with different designs of flash memory chips.

Figure 4:
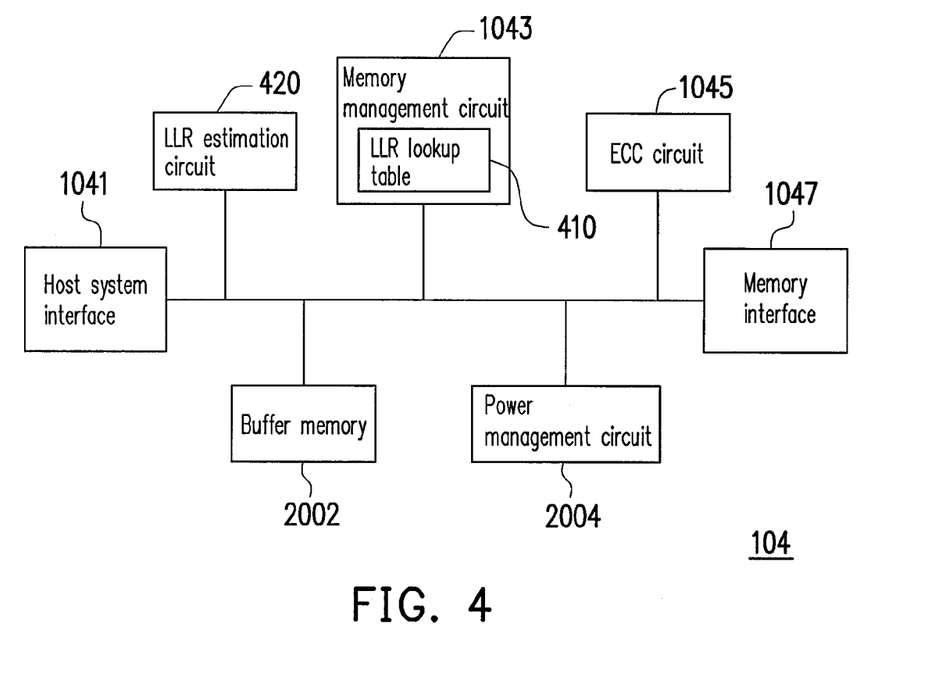
FIG. 4 is a schematic block diagram of a memory controller according to an exemplary embodiment of the present invention.

FIG. 4 is a schematic block diagram of a memory controller according to an exemplary embodiment of the present invention. Referring to FIG. 4, the memory controller 104 includes a host system interface 1041, a memory management circuit 1043, an error checking and correcting (ECC) circuit 1045, a LLR estimation circuit 420, and a memory interface 1047.

The host system interface 1041 is coupled to the memory management circuit 1043 and is used for coupling to the host system 1000 through the connector 102. The host system interface 1041 receives and identifies instructions and data from the host system 1000. Namely, the instructions and data from the host system 1000 are transmitted to the memory management circuit 1043 through the host system interface 1041. In the present exemplary embodiment, the host system interface 1041, corresponding to the connector 102, is a USB interface. However, in other exemplary embodiments, the host system interface 1041 may also be a MMC interface, a SATA interface, a PATA interface, an IEEE 1394 interface, a PCI Express interface, a SD interface, a MS interface, a CF interface, an IDE interface, or any other suitable interface.

The memory management circuit 1043 includes a LLR lookup table 410. The memory management circuit 1043 controls the operation of the memory controller 104. To be specific, the memory management circuit 1043 has a plurality of control instructions, and when the memory storage device 100 is in operation, it executes foregoing control instructions to perform various data operations, such as a data reading operation, a data writing operation and a data erasing operation, on the flash memory chip 106.

In an exemplary embodiment, the control instructions of the memory management circuit 1043 are implemented in a firmware form. For example, the memory management circuit 1043 has a microprocessor unit (not shown) and a read-only memory (ROM, not shown), and the control instructions are burnt into the ROM. When the memory storage device 100 is in operation, the control instructions are executed by the microprocessor unit to carry out various operations on the flash memory chip 106.

In another exemplary embodiment of the present invention, the control instructions of the memory management circuit 1043 may also be stored in a specific area (for example, the system area exclusively used for storing system data in the flash memory chip 106) of the flash memory chip 106 as program codes. In addition, the memory management circuit 1043 has a microprocessor unit (not shown), a ROM (not shown), and a RAM (not shown). In particular, the ROM has a driving code segment, and when the memory controller 104 is enabled, the microprocessor unit first executes the driving code segment to load the control instructions from the flash memory chip 106 into the RAM of the memory management circuit 1043. After that, the microprocessor unit runs the control instructions to perform various operations on the flash memory chip 106. Moreover, in yet another exemplary embodiment of the present invention, the control instructions of the memory management circuit 1043 may also be implemented in a hardware form.

The ECC circuit 1045 is coupled to the memory management circuit 1043 and used for ensuring data accuracy. To be specific, when the host system 1000 issues a read instruction to the memory controller 104 and the memory management circuit 1043 reads data from the flash memory chip 106 according to the read instruction, the ECC circuit 1045 performs an ECC procedure on the read data. For example, assuming the ECC circuit 1045 to be a low density parity check (LDPC) circuit, when the memory management circuit 1043 reads data from the flash memory chip 106, the ECC circuit 1045 first finds the LLR corresponding to the read data from the LLR lookup table 410 in the memory management circuit 1043 and then performs the ECC procedure according to the data and the LLR to obtain the storage state corresponding to the read data when the data is written into the flash memory chip 106.

The LLR estimation circuit 420 is coupled to the memory management circuit 1043 and the ECC circuit 1045. The LLR estimation circuit 420 accomplishes the LLR generation mechanism in the present exemplary embodiment. The detailed operation flow of the LLR generation mechanism will be described later with reference to accompanying drawings. In an exemplary embodiment, the LLR estimation circuit 420 may be implemented as a plurality of control instructions in a hardware form. In other exemplary embodiments, the LLR estimation circuit 420 may also be control instructions implemented in a firmware form or as program codes.

The memory interface 1047 is coupled to the memory management circuit 1043 and used for coupling the memory controller 104 to the flash memory chip 106. Accordingly, the memory controller 104 can perform related operations on the flash memory chip 106. Namely, data to be written into the flash memory chip 106 is converted by the memory interface 1047 into a format acceptable to the flash memory chip 106.

In another exemplary embodiment of the present invention, the memory controller 104 further includes a buffer memory 2002. The buffer memory 2002 is coupled to the memory management circuit 1043 and used for temporarily storing data from the host system 1000 or the flash memory chip 106.

In another exemplary embodiment of the present invention, the memory controller 104 still includes a power management circuit 2004. The power management circuit 2004 is coupled to the memory management circuit 1043 and used for controlling the power supply of the memory storage device 100.

Because the floating voltages in the memory cells may be changed and accordingly produce error bits when the flash memory chip 106 is idled for a long time, has electric leakage, or is frequently used, the storage state of data recorded in the flash memory chip 106 when the data is read may be different from that of the data when the data is written into the flash memory chip 106. Such a situation (the storage state of data when the data is read is different from the storage state of the data when the data is written) is referred to as a storage error. In the present exemplary embodiment, when the memory management circuit 1043 reads data according to a read instruction of the host system 1000, the LLR estimation circuit 420 obtains an amount of storage error in several storage states satisfying a statistic number and then estimates the LLR of the read data.

To be specific, when the memory management circuit 1043 of the memory storage device 100 receives a read instruction from the host system 1000 through the host system interface 1041, the memory management circuit 1043 controls the flash memory chip 106 to obtain a read data from the memory cells by using at least one bit data read voltage according to the read instruction, wherein the read data is corresponding to one of the storage states (referred to as a first storage state thereinafter) of the memory cells.

Then, the ECC circuit 1045 performs an ECC procedure (for example, a LDPC decoding procedure) on the read data to obtain a storage states (referred to as a second storage state thereinafter) corresponding to the read data when the read data is written into the flash memory chip 106. To be specific, the LLR lookup table 410 in the memory management circuit 1043 records data and a current LLR of the data corresponding to 0 or 1. When the ECC circuit 1045 is in operation, it obtains the current LLR of the read data from the LLR lookup table 410 and then corrects any error by performing the LDPC decoding procedure. Thereby, the second storage state of the read data can be obtained.

Because the flash memory chip 106 is non-volatile and offers a very low channel error rate, in the case that the channel error rate is lower than $10^{-2}$ and random data is written into the flash memory chip 106, it can be assumed that the storage error only happens between two storage states that are next to each other in the storage state order, and the storage states of the memory cells in the flash memory chip 106 present an even distribution.

Accordingly, after the LLR estimation circuit 420 obtains the first storage state and the second storage state of the read data, it first determines whether the first storage state and the second storage state are next to each other in the storage state order.

If the first storage state and the second storage state are not next to each other in the storage state order, the LLR estimation circuit 420 sets the LLR of a read bit value in the read data to plus infinity or minus infinity. For example, when the read bit value is 0, the LLR estimation circuit 420 sets the LLR to minus infinity, and when the read bit value is 1, the LLR estimation circuit 420 sets the LLR to plus infinity. It should be mentioned that aforementioned setting is only an example for describing the present exemplary embodiment conveniently, and in other exemplary embodiments, the LLR estimation circuit 420 may set the LLR of the read bit value to plus infinity when the read bit value is 0 and the LLR of the read bit value to minus infinity when the read bit value is 1.

If the first storage state and the second storage state are next to each other in the storage state order, the LLR estimation circuit 420 obtains the amount of storage error in the storage states satisfying a statistic number, wherein the storage error means that a corresponding data is in the second storage state when the data is written but is in the first storage state when the data is read. The statistic number may be the number of memory cells on a word line. However, the present invention is not limited thereto. When the memory management circuit 1043 reads a word line, the LLR estimation circuit 420 counts the amount of storage error according to whether the storage states corresponding to each memory cell on the word line when the memory cell is read and written are the same or different.

Next, the LLR estimation circuit 420 executes a logarithmic operation according to the statistic number, an amount of the storage states of each memory cell, and the amount of storage error to generate a first LLR of the read data.

Below, the logarithmic operation executed by the LLR estimation circuit 420 will be described in detail.

According to the statistics, a maximum a posterior probability (MAP) decoding algorithm based on bits is an effective method of reading data from the flash memory chip 106 and determining whether the value of the read data is 0 or 1. The MAP criterion is expressed in following expression (A):

$$\hat{u}_1 = \underset{u_1}{\operatorname{argmax}} P(u_1 \mid y) \quad (A)$$

wherein $u_1$ is an information bit (also referred to as a read bit value), y is the read data, and $P(u_1|y)$ is the posterior probability of the read bit value $u_1$ in the read data y. Taking an 8-level cell NAND flash memory as an example, the value of the read bit $u_1$ may be 0 or 1. Accordingly, foregoing expression (A) can be simplified into following expression (B):

$$\hat{u}_1 = \begin{cases} 1, & L(u_1) \geq 0 \\ 0, & L(u_1) < 0 \end{cases} \quad (B)$$

wherein $L(u_1)$ is a logarithmic a posteriori probability ratio (log-APP ratio), and which is defined with following expression (C):

$$L(u_1) = \log\left[\frac{P(u_1 = 1 \mid y)}{P(u_1 = 0 \mid y)}\right] \quad (C)$$

The log-APP ratio may also be referred to as a LLR. Thus, if the flash memory chip 106 is an 8-level cell NAND flash memory, each memory cell thereof can store data of 3 bits. When the memory management circuit 1043 reads data of one word line from the flash memory chip 106, the storage state of the read data y may be one of the storage states "111", "110", "100", "101", "001", "000", "010", and "011". In the present exemplary embodiment, it is assumed that the LSB of each memory cell is corresponding to a lower page, the CSB of each memory cell is corresponding to a middle page, and the MSB of each memory cell is corresponding to an upper page.

As described above, since the flash memory chip 106 is a non-volatile memory and offers a very low channel error rate (lower than $10^{-2}$), following expression (D) can be derived from foregoing expression (C):

$$L(u_{low,1} \mid y = RS2 \rightarrow RS1) = (2 \times u_{low,1} - 1) \times \log\left[\frac{\text{amount\_cbit\_v}_{low,1}}{\text{amount\_ebit\_v}_{low,1}}\right] \quad (D)$$

wherein $v_{low,1}$ represents the bit data of the lower page read from the flash memory chip 106, amount_cbit_$v_{low,1}$ indicates the number of $v_{low,1}$ without any storage error with a fixed statistic number, amount_ebit_$v_{low,1}$ indicates the number of $v_{low,1}$ with the storage error in the statistic number, and RS1 and RS2 respectively represent the first storage state and the second storage state of the read bit value $u_{low,1}$ (i.e., the LSB) corresponding to the lower page in the read data y. Similarly, expressions similar to foregoing expression (D) can be derived regarding the read bit value $u_{mid,1}$ (i.e., the CSB) corresponding to the middle page and the read bit value $u_{up,1}$ (i.e., the MSB) corresponding to the upper page in the read data y, and which will not be described herein.

When the channel error rate is very low and the data written into the flash memory chip 106 is random, it can be assumed that the storage error only occurs on adjacent storage states in the storage state order, and all the storage states of the memory cells in the flash memory chip 106 present an even distribution. Based on foregoing assumptions, if the first storage state of the read data y is "001", the second storage state of the read data y could only be "001", "101", or "000", and in the statistic number N, the number of data having the storage state "001" is (N/8). Accordingly, following expression (E) is derived from foregoing expression (D):

$$L(u_{low,1} \mid y = 001) = \quad (E)$$
$$-1 \times \log\left[\frac{\frac{8}{N} - a(101 \rightarrow 001)}{a(101 \rightarrow 001)}\right] \approx -1 \times \left[\frac{\frac{8}{N}}{a(101 \rightarrow 001)}\right] =$$
$$-\left(\log\left[\frac{8}{N}\right] - \log[a(101 \rightarrow 001)]\right)$$

wherein $a(101 \rightarrow 001)$ represents the amount of storage error that occurs at the LSB in the statistic number N.

Because in a 8-level cell NAND flash memory, the storage state of the read data y is one of the storage states "111", "110", "100", "101", "001", "000", "010", and "011" and the memory cells on the same word line constitutes a lower page, a middle page, and an upper page, in the present exemplary embodiment, 24 expressions similar to foregoing expression (E) can be established regarding different storage states and different pages of the read data, and these 24 expressions can be expressed as following general expression (1):

$$\text{LLR\_c} = -\left(\log\left[\frac{S}{N}\right] - \log[W]\right) \quad (1)$$

wherein N represents the statistic number, S represents the amount of the storage states, and W represents the amount of storage error. In the present exemplary embodiment, the LLR estimation circuit 420 calculates the first LLR (LLR_c) of the read data by using the expression (1).

Figure 5:
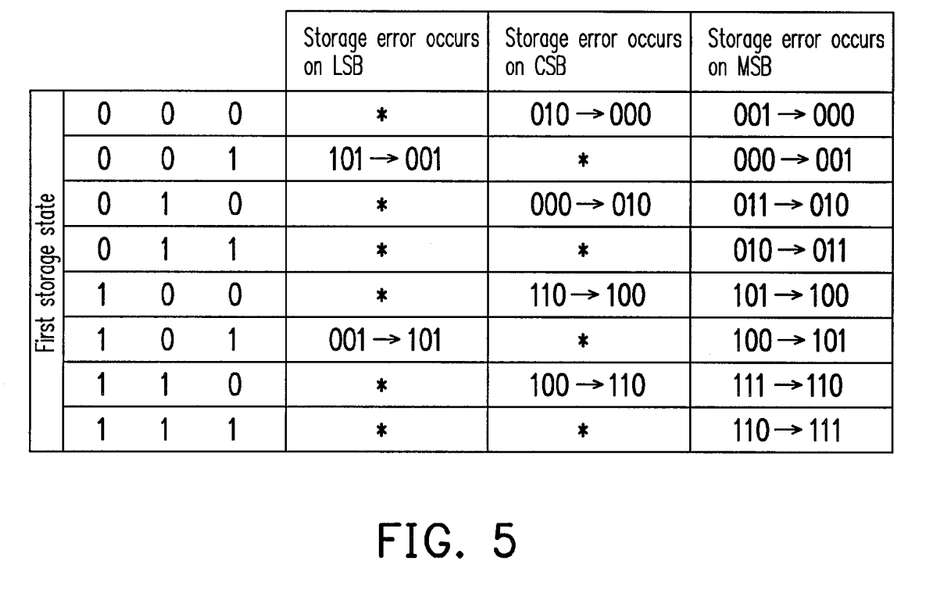
FIG. 5 illustrates a storage state and corresponding possible storage errors according to the exemplary embodiment illustrated in FIG. 3.

FIG. 5 illustrates a storage state and corresponding possible storage errors according to the exemplary embodiment illustrated in FIG. 3. In FIG. 5, the storage state to the right of the symbol "→" is the first storage state of the read data, and the storage state to the left of the symbol "→" is the second storage state of the read data.

Referring to both FIG. 3 and FIG. 5, when the first storage state of the read data is "000", the second storage state thereof may be "010" or "001", when the first storage state of the read data is "001", the second storage state thereof may be "101" or "000", when the first storage state of the read data is "010", the second storage state thereof may be "000" or "011", and so on.

In FIG. 5, the symbol "*" indicates that it is not likely to have the storage error occurring on the corresponding bit if the read data is corresponding to the first storage state when the data is read. For example, when the first storage state of the read data is "100", the second storage state of the read data should be "000" if the storage error occurs on the LSB. However, because it is assumed in the present exemplary embodiment that the storage error only occurs on two adjacent storage states in the storage state order and the storage state "000" and the storage state "100" are not adjacent (as shown in FIG. 3), the storage error is not likely to occur on the LSB when the first storage state of the read data is "100". Herein it is assumed that the second storage state of the read data won't be "000". Namely, the LLR of the LSB 0 is minus infinity.

In an exemplary embodiment, when the LLR estimation circuit 420 obtains the first storage state of the read data as "001" and the second storage state thereof as "000", the LLR estimation circuit 420 counts the amount of storage error in the data stored in the memory cells satisfying the statistic number and calculates the first LLR by using foregoing expression (1), wherein the storage error means that the data is in the storage state "000" when it is written and is in the storage state "001" when it is read. However, if the first storage state of the read data is "001" but the second storage state thereof is "100", because the first storage state and the second storage state are not adjacent in the storage state order, the LLR estimation circuit 420 sets the first LLR to plus infinity or minus infinity according to the value of a read bit in the read data. The correspondence illustrated in FIG. 5 can be used for calculating the LLRs of the read data when the storage error happens on the LSB, the CSB, or the MSB.

Figure 6:
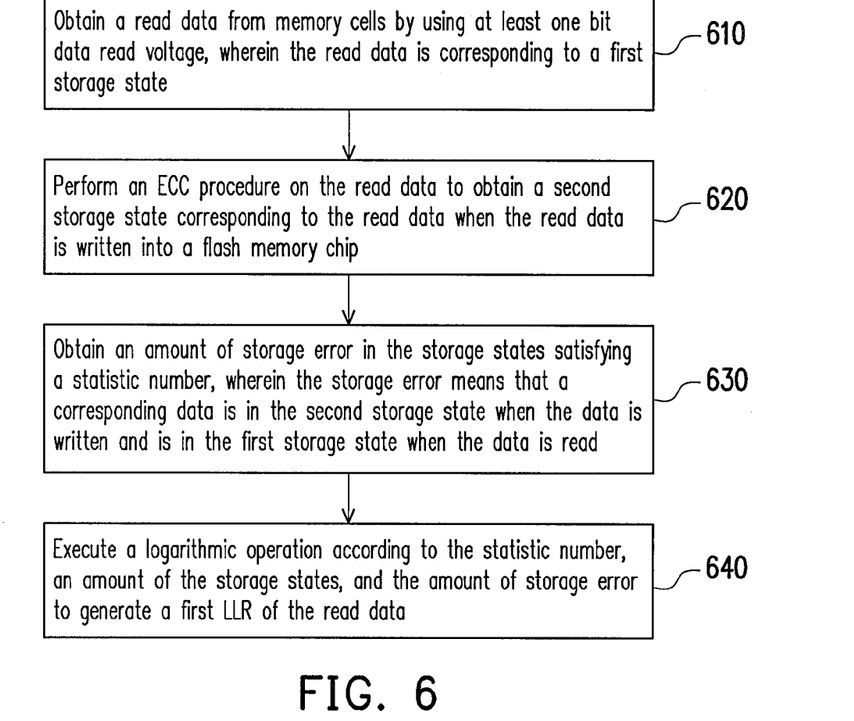
FIG. 6 is a flowchart illustrating a method for generating a log likelihood ratio (LLR) according to an exemplary embodiment of the present invention.

FIG. 6 is a flowchart illustrating a LLR generation method according to an exemplary embodiment of the present invention.

When the memory storage device 100 receives a read instruction from the host system 1000, in step 610, the memory management circuit 1043 in the memory controller 104 controls the flash memory chip 106 to obtain a read data from the memory cells by using at least one bit data read voltage, wherein the read data is corresponding to a first storage state.

Then, in step 620, the ECC circuit 1045 in the memory controller 104 performs an ECC procedure on the read data to obtain a second storage state corresponding to the read data when the read data is written into the flash memory chip 106.

Next, in step 630, the LLR estimation circuit 420 in the memory controller 104 obtains an amount of storage error in the storage states satisfying a statistic number, wherein the storage error means that a corresponding data is in the second storage state when the data is written and is in the first storage state when the data is read.

Finally, in step 640, the LLR estimation circuit 420 executes a logarithmic operation according to the statistic number, an amount of the storage states, and the amount of storage error to generate a first LLR of the read data.

In the exemplary embodiment described above, after the LLR estimation circuit 420 generates the first LLR of the read data, it can directly update the LLR lookup table 410 in the memory management circuit 1043 by using the first LLR. Namely, the LLR estimation circuit 420 replaces the current LLR corresponding to the read data in the LLR lookup table 410 with the first LLR.

However, because the LLR estimation circuit 420 calculates the first LLR every time when it reads data, the first LLR generated may not be able to reflect the error patterns of all blocks in the flash memory chip 106. In order to improve the error correcting efficiency of the memory storage device 100, in following exemplary embodiment, the first LLR generated by the LLR estimation circuit 420 is not used for updating the LLR lookup table 410. Instead, a filtering process has to be performed on the first LLR before the first LLR is used for updating the LLR lookup table 410.

Figure 7:
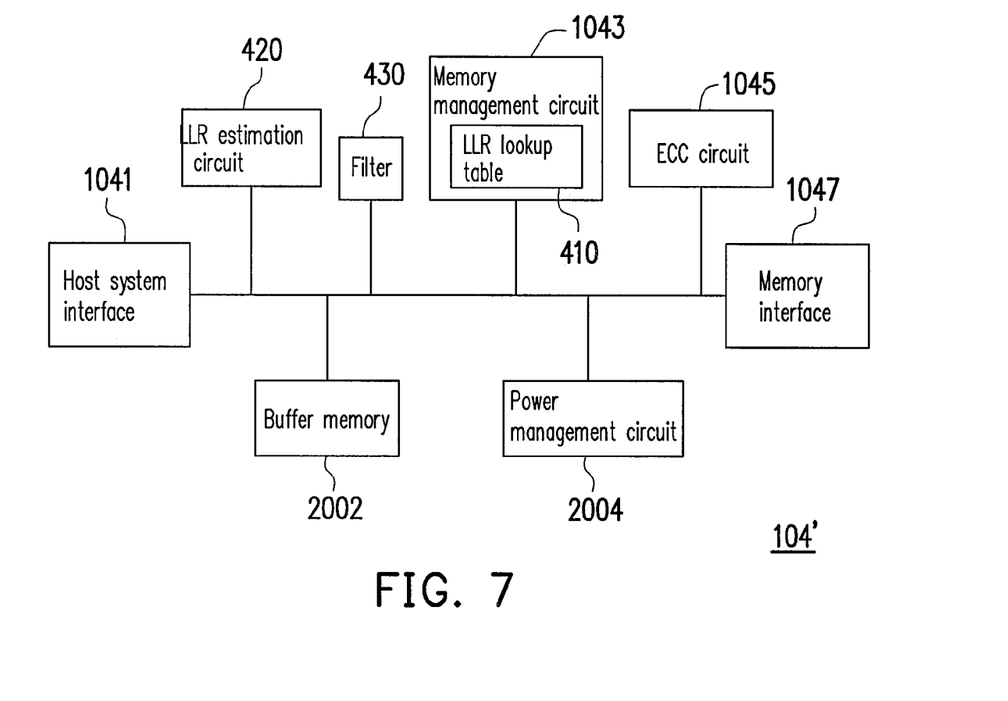
FIG. 7 is a schematic block diagram of a memory controller according to another exemplary embodiment of the present invention.

FIG. 7 is a schematic block diagram of a memory controller according to another exemplary embodiment of the present invention. The memory controller 104' in FIG. 7 is similar to the memory controller 104 illustrated in FIG. 4, and the difference between the two will be explained below.

In the present exemplary embodiment, the memory controller 104' further includes a filter 430. The filter 430 is coupled to the memory management circuit 1043 and the LLR estimation circuit 420. The filter 430 may be a finite impulse response (FIR) filter or an infinite impulse response (IIR) filter. However, the present invention is not limited thereto.

After the LLR estimation circuit 420 generates the first LLR of the read data, the filter 430 performs a filtering process on the first LLR to generate a second LLR, and the filter 430 replaces the current LLR corresponding to the read data in the LLR lookup table 410 with the second LLR.

In an exemplary embodiment, the filter 430 obtains the current LLR corresponding to the read data from the LLR lookup table 410. Then, the filter 430 performs the filtering process on the first LLR and the current LLR to generate the second LLR, and the filter 430 then replaces the current LLR corresponding to the read data in the LLR lookup table 410 with the second LLR. For example, the filter 430 performs the filtering process by using following expression (2), so as to obtain the second LLR (LLR_f) to be updated into the LLR lookup table:

$$\text{LLR}\_f = a \times \text{LLR}\_c + b \times \text{LLR}\_p \quad (2)$$

wherein LLR_p represents the current LLR corresponding to the read data in the LLR lookup table 410, LLR_c represents the first LLR, and a and b are filtering process coefficients. In the present exemplary embodiment, the sum of a and b is 1.

In another exemplary embodiment, the filter 430 is an IIR filter, and which performs the filtering process on the first LLR, so as to generate the second LLR (LLR_f), by using following expression (3):

$$\text{LLR}\_f = \frac{n \times \text{LLR}\_c}{1 - m \times Z^{-1}} \quad (3)$$

wherein m and n are IIR filtering process coefficients, LLR_c represents the first LLR, and $Z^{-1}$ represents a delay processing time.

In the present exemplary embodiment, the filter 430 in the memory controller 104' replaces the original LLR in the LLR lookup table 410 with the second LLR generated by performing a filtering process on the first LLR. Accordingly, even when the error pattern of the block corresponding to the read data is very different from those of other blocks, the updated LLR in the LLR lookup table 410 can still reflect the error patterns of all blocks in the flash memory chip 106. Thereby, the execution time of the ECC procedure is shortened.

Figure 8:
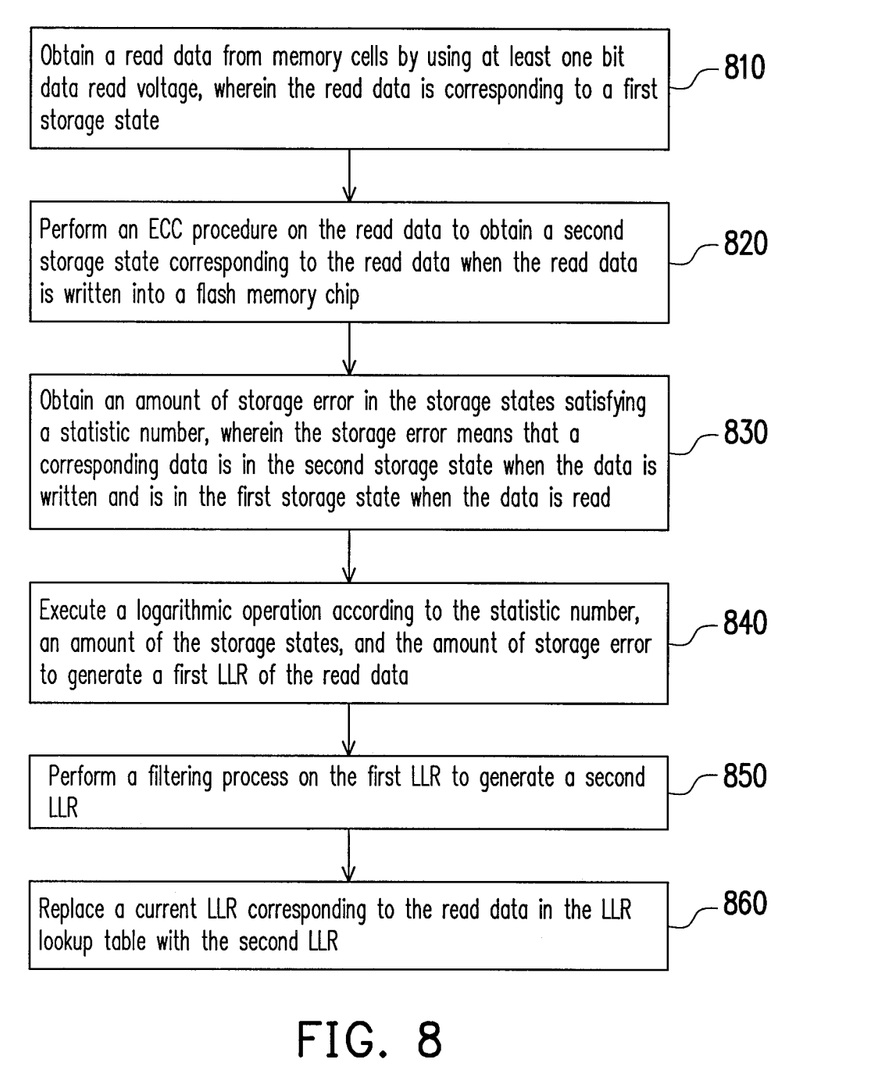
FIG. 8 is a flowchart illustrating a method for generating a LLR according to another exemplary embodiment of the present invention.

FIG. 8 is a flowchart illustrating a LLR generation method according to another exemplary embodiment of the present invention. The steps 810-840 in FIG. 8 are the same as or similar to the steps 610-640 in FIG. 6 therefore will not be described herein.

After the LLR estimation circuit 420 generates the first LLR of the read data, in step 850, the filter 430 performs the filtering process on the first LLR to generate the second LLR. In step 860, the filter 430 replaces the current LLR corresponding to the read data in the LLR lookup table 410 with the second LLR.

In summary, the exemplary embodiments of the present invention provides a LLR generation method, a memory storage device, and a memory controller, wherein when data is read from a flash memory chip, the LLR of the read data is calculated by using the amount of data with a storage error. Since probability of bit storage error in a flash memory chip is lower than 1%, the consumption of system resources for generating the LLR can be reduced by calculating only the amount of data with the storage error. In addition, in the present invention, a LLR lookup table is dynamically updated by using the estimated LLR. In particular, the generated LLR is filtered before it is used for updating the LLR lookup table, so that the updated LLR can be more accurate and stable. Accordingly, the iterative times of the ECC procedure is reduced and the execution efficiency thereof is improved. The advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A log likelihood ratio (LLR) generation method, adaptable to a memory storage device, wherein the memory storage device comprises a flash memory chip having a plurality of memory cells, each of the memory cells has a plurality of storage states, and the storage states are distinguished by at least one bit data read voltage, the method comprising:
   obtaining a read data from the memory cells by using the at least one bit data read voltage, wherein the read data is corresponding to a first storage state, and the first storage state is one of the storage states;
   performing an error checking and correcting (ECC) procedure on the read data to obtain a second storage state corresponding to the read data when the read data is written, wherein the second storage state is one of the storage states;
   obtaining an amount of storage error in the storage states satisfying a statistic number, wherein the storage error means that a corresponding data is in the second storage state when the data is written and is in the first storage state when the data is read; and
   executing a logarithmic operation according to the statistic number, an amount of the storage states, and the amount of storage error to generate a first LLR of the read data.

2. The LLR generation method according to claim 1, wherein the storage states have a storage state order, and the step of obtaining the amount of storage error in the storage states satisfying the statistic number further comprises:
   determining whether the first storage state and the second storage state are next to each other in the storage state order; and
   when the first storage state and the second storage state are next to each other in the storage state order, counting the amount of storage error in the storage states satisfying the statistic number.

3. The LLR generation method according to claim 2, wherein after the step of determining whether the first storage state and the second storage state are next to each other in the storage state order, the LLR generation method further comprises:
   when the first storage state and the second storage state are not next to each other in the storage state order, setting the first LLR to plus infinity or minus infinity according to a read bit value in the read data.

4. The LLR generation method according to claim 1, wherein the step of executing the logarithmic operation according to the statistic number, the amount of the storage states, and the amount of storage error to generate the first LLR of the read data comprises calculating by following expression (1):

$$LLR\_c = -\left(\log\left[\frac{S}{N}\right] - \log[W]\right) \quad (1)$$

wherein LLR_c represents the first LLR, N represents the statistic number, S represents the amount of the storage states, and W represents the amount of storage error.

5. The LLR generation method according to claim 1, wherein the memory storage device has a LLR lookup table for recording a current LLR corresponding to the read data, and after the step of executing the logarithmic operation according to the statistic number, the amount of the storage states, and the amount of storage error to generate the first LLR of the read data, the LLR generation method further comprises:
   replacing the current LLR in the LLR lookup table with the first LLR.

6. The LLR generation method according to claim 1, wherein the memory storage device has a LLR lookup table for recording a current LLR corresponding to the read data, and after the step of executing the logarithmic operation according to the statistic number, the amount of the storage states, and the amount of storage error to generate the first LLR of the read data, the LLR generation method further comprises:
   performing a filtering process on the first LLR to generate a second LLR; and
   replacing the current LLR in the LLR lookup table with the second LLR.

7. The LLR generation method according to claim 6, wherein the step of performing the filtering process on the first LLR to generate the second LLR comprises calculating by following expression (3):

$$LLR\_f = \frac{n \times LLR\_c}{1 - m \times Z^{-1}} \quad (3)$$

wherein LLR_j represents the second LLR, LLR_c represents the first LLR, m and n respectively represent a filtering process coefficient, and $Z^{-1}$ represents a delay processing time.

8. The LLR generation method according to claim 1, wherein the statistic number is a number of memory cells on a word line.

9. A memory controller, comprising:
a host system interface, for coupling to a host system;
a memory interface, for coupling to a flash memory chip, wherein the flash memory chip comprises a plurality of memory cells, each of the memory cells has a plurality of storage states, and the storage states are distinguished by at least one bit data read voltage;
a memory management circuit, coupled to the host system interface and the memory interface, for receiving a read instruction from the host system and obtaining a read data corresponding to the read instruction from the memory cells through the memory interface, wherein the read data is corresponding to a first storage state, the first storage state is one of the storage states, and the memory management circuit comprises a LLR lookup table;
an ECC circuit, coupled to the memory management circuit, for performing an ECC procedure on the read data to obtain a second storage state corresponding to the read data when the read data is written, wherein the second storage state is one of the storage states; and
a LLR estimation circuit, coupled to the memory management circuit and the ECC circuit, for obtaining an amount of storage error in the storage states satisfying a statistic number and executing a logarithmic operation according to the statistic number, an amount of the storage states, and the amount of storage error to generate a first LLR of the read data, wherein the storage error means that a corresponding data is in the second storage state when the data is written and is in the first storage state when the data is read.

10. The memory controller according to claim 9, wherein the storage states have a storage state order, and the LLR estimation circuit further determines whether the first storage state and the second storage state are next to each other in the storage state order, when the LLR estimation circuit determines that the first storage state and the second storage state are next to each other in the storage state order, the LLR estimation circuit counts the amount of storage error in the storage states satisfying the statistic number.

11. The memory controller according to claim 10, wherein when the LLR estimation circuit determines that the first storage state and the second storage state are not next to each other in the storage state order, the LLR estimation circuit sets the first LLR to plus infinity or minus infinity according to a read bit value in the read data.

12. The memory controller according to claim 9, wherein the LLR estimation circuit calculates the first LLR of the read data by using following expression (1):

$$LLR\_c = -\left(\log\left[\frac{S}{N}\right] - \log[W]\right) \quad (1)$$

wherein LLR_c represents the first LLR, N represents the statistic number, S represents the amount of the storage states, and W represents the amount of storage error.

13. The memory controller according to claim 9, wherein the LLR lookup table records a current LLR corresponding to the read data, and the LLR estimation circuit replaces the current LLR in the LLR lookup table with the first LLR.

14. The memory controller according to claim 9, wherein the LLR lookup table records a current LLR corresponding to the read data, and the memory controller further comprises:
a filter, coupled to the memory management circuit and the LLR estimation circuit, for performing a filtering process on the first LLR to generate a second LLR and replacing the current LLR in the LLR lookup table with the second LLR.

15. The memory controller according to claim 14, wherein the filter performs the filtering process on the first LLR to generate the second LLR by using following expression (3):

$$LLR\_f = \frac{n \times LLR\_c}{1 - m \times Z^{-1}} \quad (3)$$

wherein LLR_f represents the second LLR, LLR_c represents the first LLR, m and n respectively represent a filtering process coefficient, and $Z^{-1}$ represents a delay processing time.

16. The memory controller according to claim 9, wherein the statistic number is a number of memory cells on a word line.

17. A memory storage device, comprising:
a connector, for coupling to a host system;
a flash memory chip, comprising a plurality of memory cells, wherein each of the memory cells has a plurality of storage states, and the storage states are distinguished by at least one bit data read voltage; and
a memory controller, coupled to the flash memory chip and the connector, comprising a LLR lookup table, wherein the memory controller controls the flash memory chip to obtain a read data from the memory cells by using the at least one bit data read voltage, wherein read data is corresponding to a first storage state, and the first storage state is one of the storage states, the memory controller also performs an ECC procedure on the read data to obtain a second storage state corresponding to the read data when the read data is written, wherein the second storage state is one of the storage states, the memory controller further obtains an amount of storage error in the storage states satisfying a statistic number, wherein the storage error means that a corresponding data is in the second storage state when the data is written and is in the first storage state when the data is read, and the memory controller executes a logarithmic operation according to the statistic number, an amount of the storage states, and the amount of storage error to generate a first LLR of the read data.

18. The memory storage device according to claim 17, wherein the storage states have a storage state order, and the memory controller further determines whether the first storage state and the second storage state are next to each other in the storage state order, when the first storage state and the second storage state are next to each other in the storage state order, the memory controller counts the amount of storage error in the storage states satisfying the statistic number.

19. The memory storage device according to claim 18, wherein when the memory controller determines that the first storage state and the second storage state are not next to each other in the storage state order, the memory controller sets the first LLR to plus infinity or minus infinity according to a read bit value in the read data.

20. The memory storage device according to claim 17, wherein the memory controller calculates the first LLR of the read data by using following expression (1):

$$LLR\_c = -\left(\log\left[\frac{S}{N}\right] - \log[W]\right) \quad (1)$$

wherein LLR_c represents the first LLR, N represents the statistic number, S represents the amount of the storage states, and W represents the amount of storage error.

21. The memory storage device according to claim 17, wherein the LLR lookup table records a current LLR corresponding to the read data, and the memory controller replaces the current LLR in the LLR lookup table with the first LLR.

22. The memory storage device according to claim 17, wherein the LLR lookup table records a current LLR corresponding to the read data, and the memory controller performs a filtering process on the first LLR to generate a second LLR and replaces the current LLR in the LLR lookup table with the second LLR.

23. The memory storage device according to claim 22, wherein the memory controller performs the filtering process on the first LLR to generate the second LLR by using following expression (3):

$$LLR\_f = \frac{n \times LLR\_c}{1 - m \times Z^{-1}} \quad (3)$$

wherein LLR_f represents the second LLR, LLR_c represents the first LLR, m and n respectively represent a filtering process coefficient, and $Z^{-1}$ represents a delay processing time.

24. The memory storage device according to claim 17, wherein the statistic number is a number of memory cells on a word line.

* * * * *